(12) United States Patent
Kern

(10) Patent No.: US 9,812,835 B2
(45) Date of Patent: Nov. 7, 2017

(54) METHOD FOR ESTABLISHING AN ELECTRICALLY CONDUCTIVE CONNECTION BETWEEN AN ELECTRICAL LINE AND AN ELECTRICAL CONDUCTIVE COMPONENT

(71) Applicant: ElringKlinger AG, Dettingen (DE)

(72) Inventor: Stephanie Kern, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 15/078,687

(22) Filed: Mar. 23, 2016

(65) Prior Publication Data

US 2016/0199932 A1 Jul. 14, 2016

Related U.S. Application Data

(63) Continuation of application No. PCT/EP2014/070256, filed on Sep. 23, 2014.

(30) Foreign Application Priority Data

Sep. 24, 2013 (DE) .................. 10 2013 219 150

(51) Int. Cl.
*H01R 43/02* (2006.01)
*H01R 4/62* (2006.01)
(Continued)

(52) U.S. Cl.
CPC ......... *H01R 43/0207* (2013.01); *B23K 20/10* (2013.01); *H01R 4/187* (2013.01);
(Continued)

(58) Field of Classification Search
CPC .......... B23K 1/06; B23K 20/10; B23K 31/02; B23K 33/00; B23K 2201/38; H01R 4/02;
(Continued)

(56) References Cited

U.S. PATENT DOCUMENTS 3,717,842 A 2/1973 Douglas, Jr.
6,079,608 A * 6/2000 Steiner .................. B23K 20/10
228/1.1
(Continued)

FOREIGN PATENT DOCUMENTS

DE 30 17 364 11/1981
DE 100 07 258 8/2001
(Continued)

OTHER PUBLICATIONS

Volker, Kratt, "Basics of Crimping Technology," *Cochem: Eigenverlag*, Sep. 1, 2005, pp. K12/07_2 and A04/02, 2005 Edition.

*Primary Examiner* — Carl Arbes
(74) *Attorney, Agent, or Firm* — Womble Carlyle Sandridge & Rice LLP

(57) ABSTRACT

In order to provide a method for establishing an electrically conductive connection between an electrical line which includes a plurality of individual conductors and an electrically conductive component which is easily realizable but nevertheless leads to a corrosion resistant connection between the individual conductors of the electrical line and the electrically conductive component, it is proposed that the method includes producing a crimping element that surrounds the individual conductors sectionally from a crimping element preform by means of a crimping tool, and connecting at least a portion of the individual conductors to the electrically conductive component by an ultrasonic welding process by means of a sonotrode.

21 Claims, 12 Drawing Sheets

(51) Int. Cl.
*H01R 43/048* (2006.01)
*B23K 20/10* (2006.01)
*H01R 4/18* (2006.01)
*B23K 101/38* (2006.01)

(52) U.S. Cl.
CPC ......... *H01R 4/625* (2013.01); *H01R 43/0484* (2013.01); *B23K 2201/38* (2013.01); *H01R 4/184* (2013.01)

(58) Field of Classification Search
CPC ........ H01R 4/184; H01R 4/187; H01R 4/625; H01R 43/0207; H01R 43/0484
See application file for complete search history.

(56) References Cited

U.S. PATENT DOCUMENTS

| | | | |
|---|---|---|---|
| 7,128,807 B2* | 10/2006 | Morschner | B23K 20/10 156/580.1 |
| 7,374,466 B2 | 5/2008 | Onuma et al. | |
| 8,448,836 B2 | 5/2013 | Schloms et al. | |
| 2009/0152325 A1* | 6/2009 | Frank | B23K 20/10 228/102 |
| 2011/0048763 A1* | 3/2011 | Schloms | B23K 20/10 174/90 |
| 2011/0155701 A1* | 6/2011 | Gerst | B23K 11/0026 219/117.1 |
| 2012/0125976 A1* | 5/2012 | Steiner | B23K 20/10 228/110.1 |
| 2012/0298645 A1* | 11/2012 | Kleespiess | H01R 4/029 219/137 R |
| 2014/0144016 A1 | 5/2014 | Bauer et al. | |

FOREIGN PATENT DOCUMENTS

| | | |
|---|---|---|
| DE | 10 2011 089 206 | 6/2013 |
| EP | 2 362 491 | 8/2011 |
| FR | 2 501 923 | 9/1982 |

\* cited by examiner

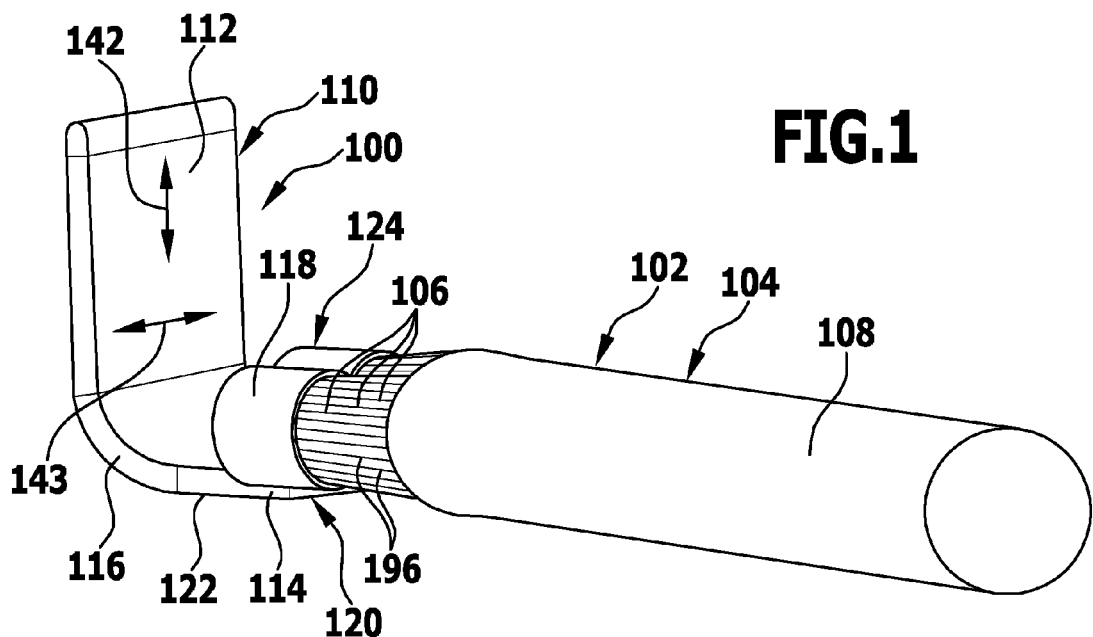
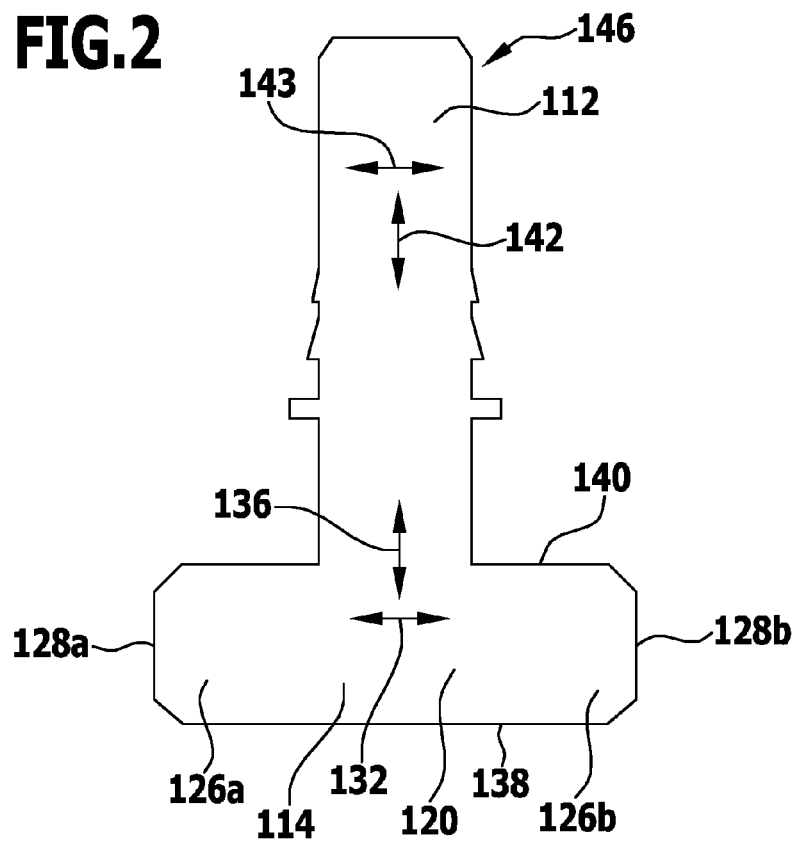

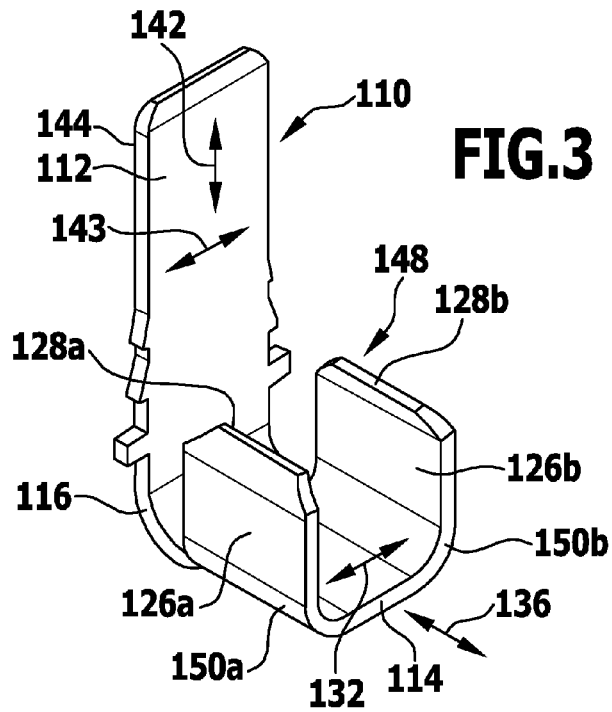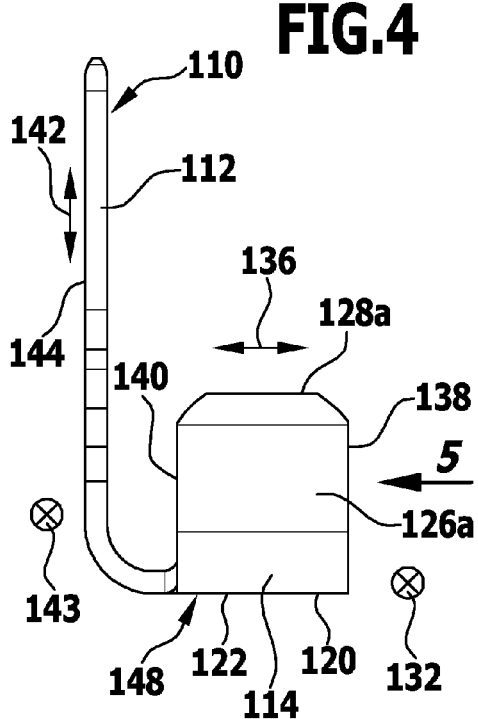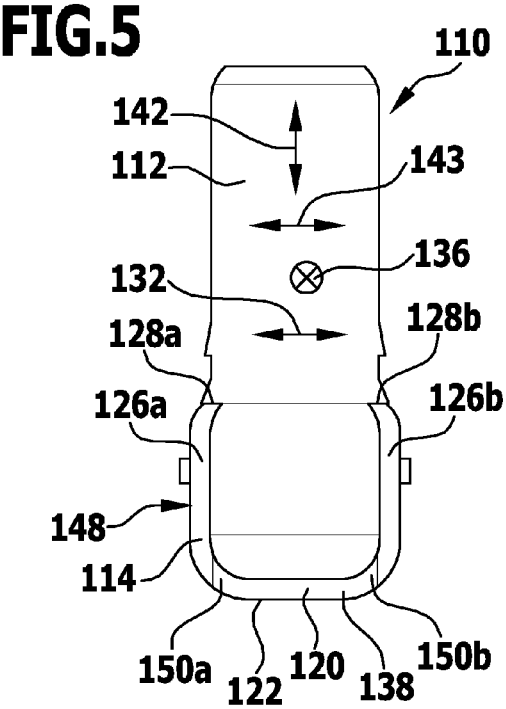

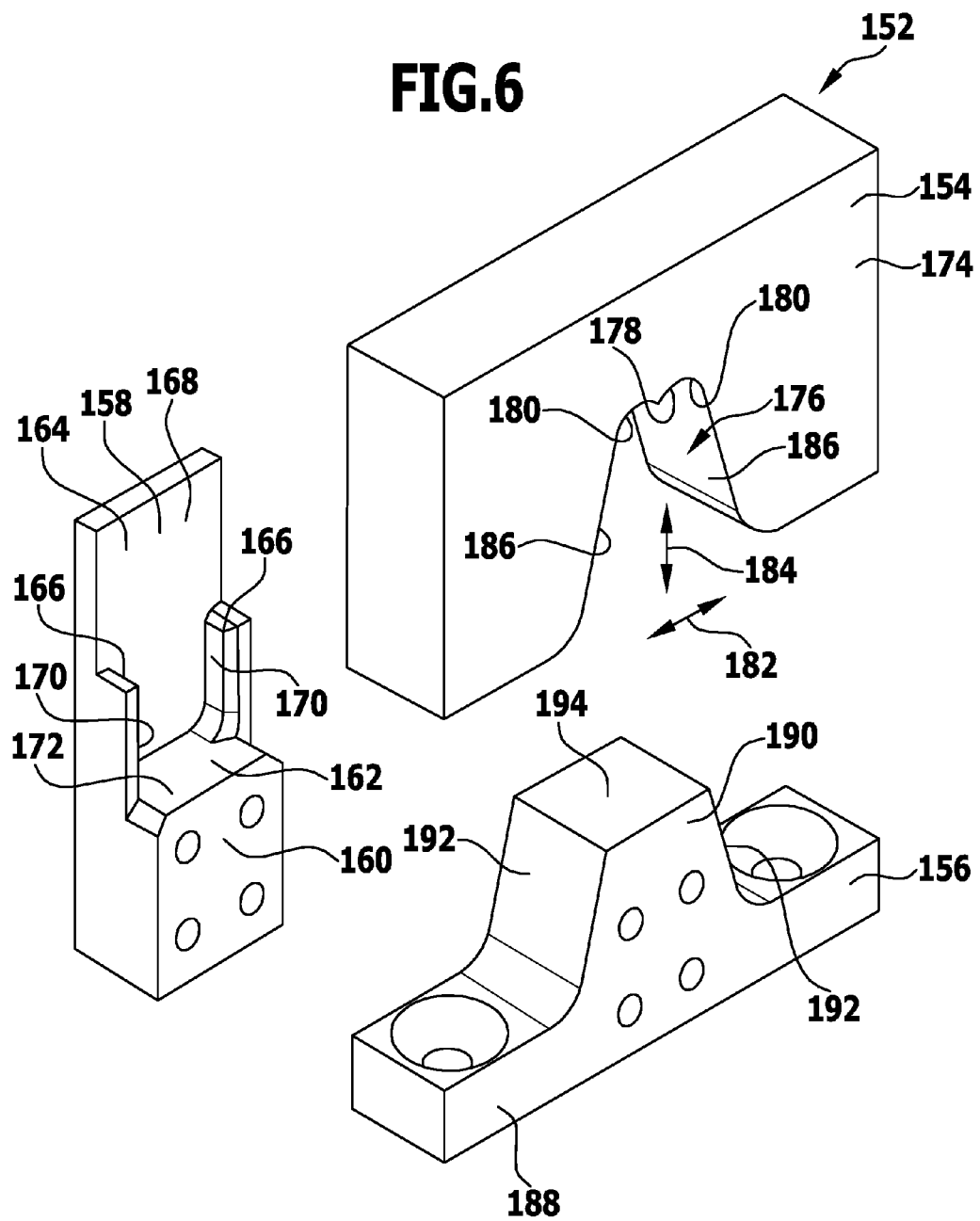

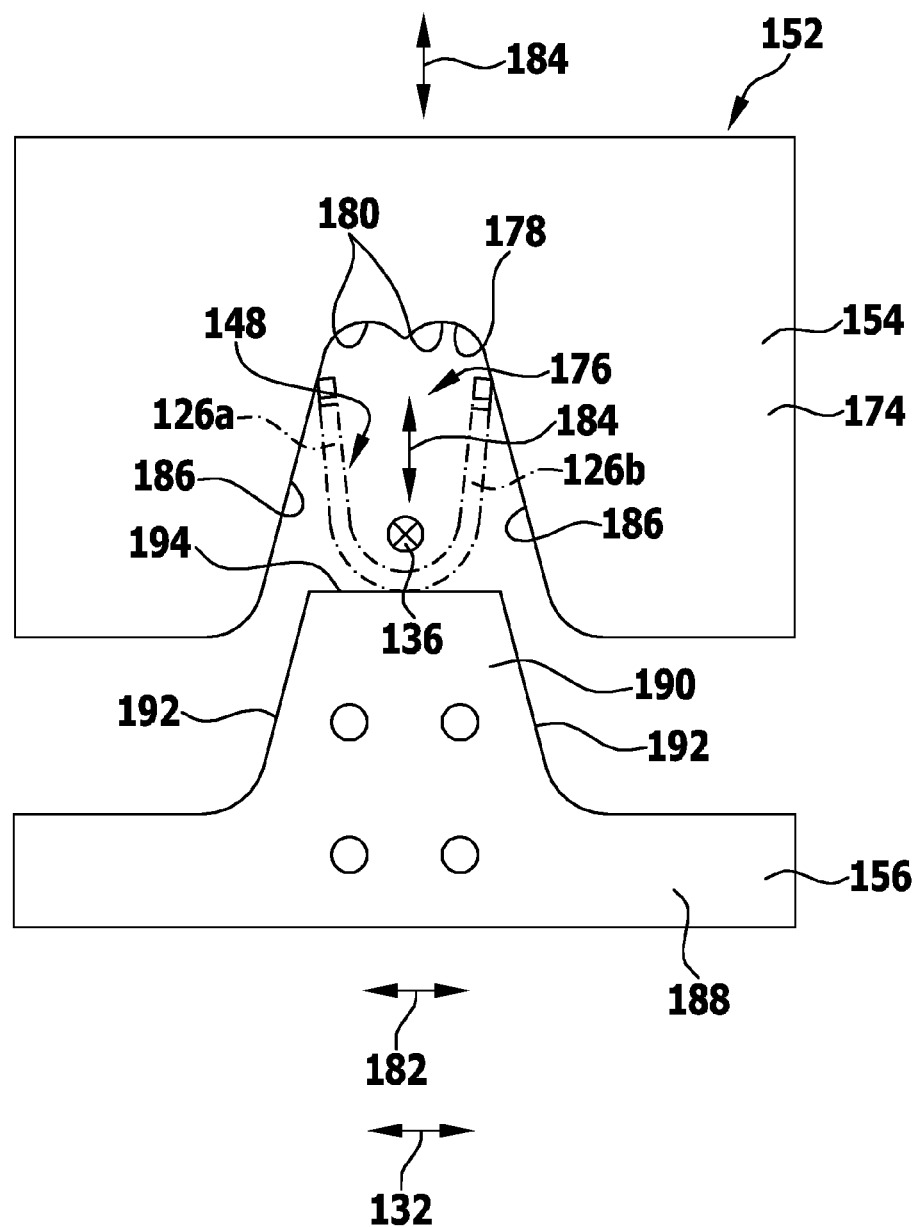

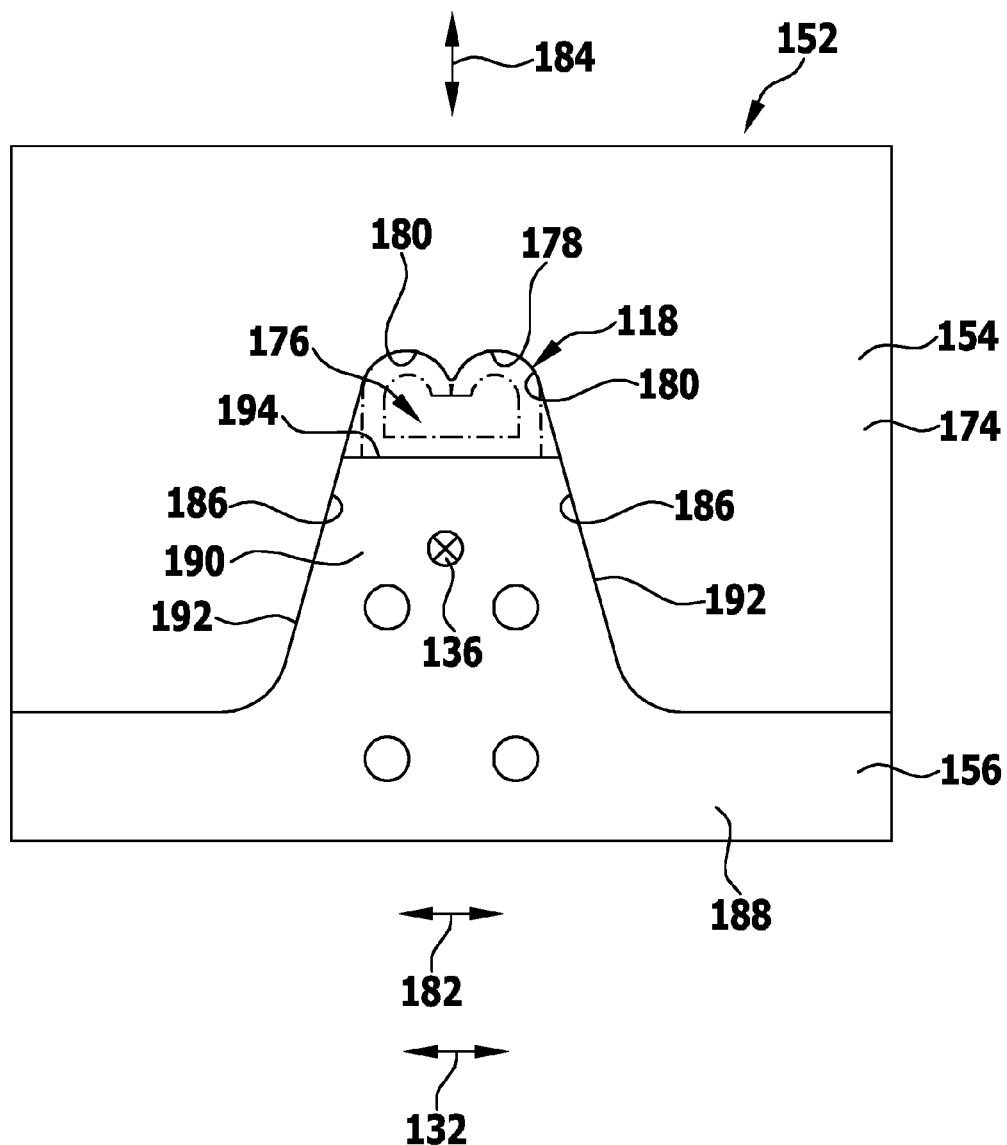

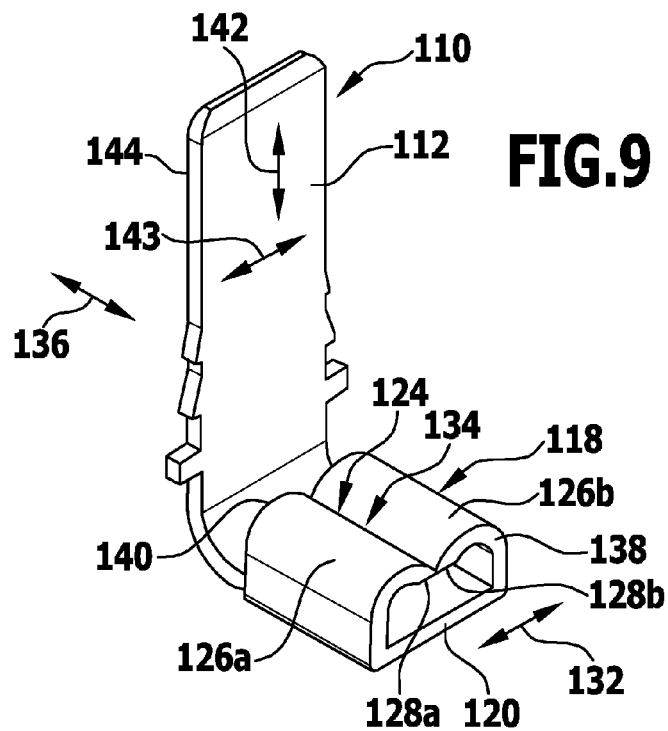
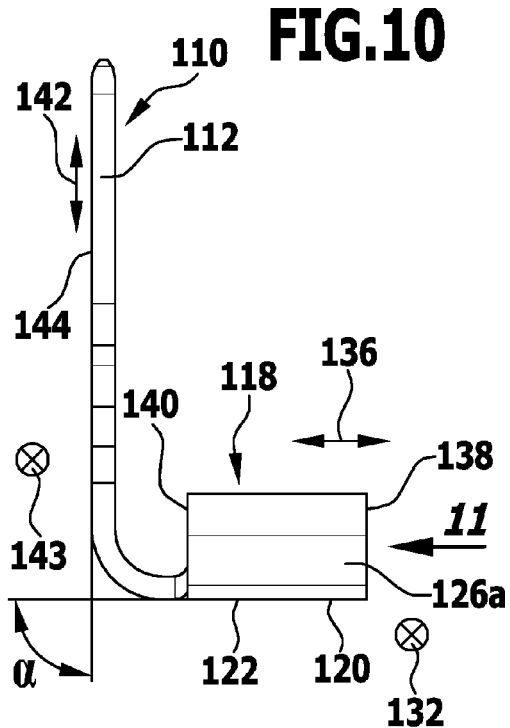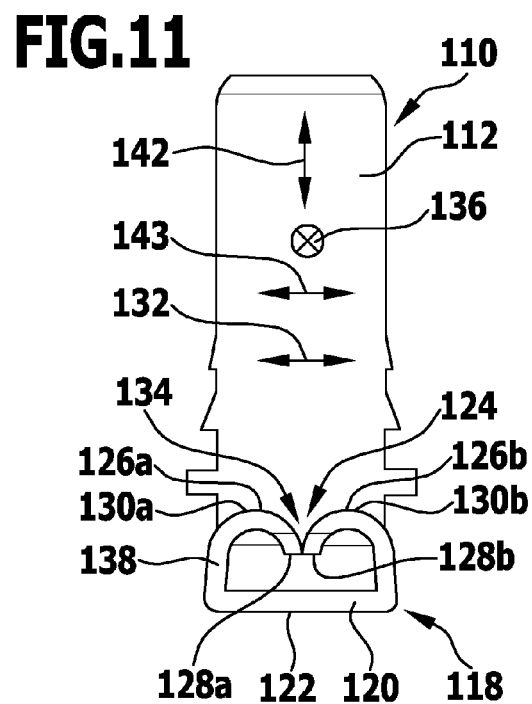

METHOD FOR ESTABLISHING AN ELECTRICALLY CONDUCTIVE CONNECTION BETWEEN AN ELECTRICAL LINE AND AN ELECTRICAL CONDUCTIVE COMPONENT

RELATED APPLICATION

This application is a continuation application of PCT/EP2014/070256 filed on Sep. 23, 2014, which claims priority to German patent application no. 10 2013 219 150.2 filed on Sep. 24, 2013, each of which is incorporated herein by reference.

FIELD OF DISCLOSURE

The present invention relates to a method for establishing an electrically conductive connection between an electrical line which comprises a plurality of individual conductors and an electrically conductive component.

BACKGROUND

In the case of one known method of this type, aluminum strands of an electrical line are connected to a nickel-plated and silvered copper blade by ultrasonic welding.

The problem thereby is that the connection between the aluminum strands and the copper blade corrodes under the influence of air humidity and/or an NaCl solution so that the tensile strength of the connection drops considerably due to corrosion.

SUMMARY OF THE INVENTION

The object of the present invention is to provide a method for establishing an electrically conductive connection between an electrical line which comprises a plurality of individual conductors and an electrically conductive component which is easily realizable and is preferably effected without the use of any additional corrosion protection but nevertheless leads to a corrosion resistant connection between the individual conductors of the electrical line and the electrically conductive component.

This object is achieved by a method for establishing an electrically conductive connection between an electrical line which comprises a plurality of individual conductors and an electrically conductive component, which comprises the following:
  producing a crimping element that surrounds the individual conductors sectionally from a crimping element preform by means of a crimping tool;
  connecting at least a portion of the individual conductors to the electrically conductive component by an ultrasonic welding process by means of a sonotrode.

The concept underlying the present invention is to combine mechanical fixing of the individual conductors by the crimping process with improved compacting of the individual conductors due to the crimping action and by use of the ultrasonic welding process.

The individual conductors are compacted to such an extent by the crimping process and the following ultrasonic welding process that the whole assembly of individual conductors approximates to a solid material. Corrosion cannot find a sufficiently large corrodible surface on the compacted individual conductors as to crucially damage the joint.

The additional mechanical securing and/or fixing of the individual conductors by the crimping process additionally prevents the individual conductors from becoming separated from the connection to the electrically conductive component even if corrosion should nevertheless occur.

In the crimping process, i.e., when producing the crimping element that surrounds the individual conductors sectionally, the individual conductors are preferably completely surrounded by the crimping element before the ultrasonic welding process.

Uneven distribution of the individual conductors and hence uneven compression during the ultrasonic welding process are thereby prevented.

The crimping process, which is preferably carried out before the ultrasonic welding process, causes the individual conductors to adopt a defined shape, this thereby leading to greater reliability of the subsequent ultrasonic welding process.

Due to the improved compacting of the individual conductors and the significantly improved mechanical fixing produced by the crimping process, the effect can be achieved that the connection between the electrical line and the electrically conductive component has greater strength and will not be broken by loosening of the ultrasonically welded connection but only in the event of material failure of the individual conductors. Thus, the individual conductors behind the weld are more likely to break away before the connection separates at the welded joint.

The initial values for the tensile strength of the connection between the electrical line and the electrically conductive component are already significantly higher immediately after the establishment of the electrically conductive connection than was the case in the known connecting process. Since the tensile strength of the connection is no longer determined by the failure of the welded joint, but rather, by a failure in the material of the individual conductors, the reliability of the process is significantly increased due to the fact that the individual conductors will always sever at similar values of the tensile load.

The individual conductors are protected due to being surrounded by the crimping element and by virtue of the process of welding at least a portion of the individual conductors to the crimping element. Furthermore, contraction of the individual conductors which could lead to the individual conductors severing more readily is prevented during the ultrasonic welding process. Consequently, in the method in accordance with the invention, predetermined breaking points are not produced in the individual conductors.

Due to the greater degree of compaction and the complete enclosure of the welded joint by the material of the crimping element, the corrodible surface available for the formation of corrosion is significantly reduced, this thereby significantly increasing the corrosion resistance of the resultant connection.

In particular, a junction point between the electrical line and the electrically conductive component that has been established by the method in accordance with the invention can be employed without the application of a corrosion protection medium to the junction point.

In a preferred embodiment of the method in accordance with the invention, provision is made for the sonotrode to be different from the crimping tool.

Thus, the crimping process and the ultrasonic welding process are preferably carried out successively in different tools.

Preferably, the ultrasonic welding process is only begun after the production of the crimping element.

In one preferred embodiment of the invention, provision is made for the individual conductors to be compacted both by means of the crimping tool and also by means of the sonotrode of the ultrasonic welding tool.

The spatial volume between the individual conductors of the electrical line that remains in the region of the crimping element is thus reduced by the crimping process and is reduced still further by the ultrasonic welding process.

Good compaction of the individual conductors is obtained, in particular, if the welding pressure of the sonotrode amounts at least intermittently to at least approximately 3 bar, in particular, to at least approximately 4 bar, to at least approximately 5 bar for example.

In tests, a welding pressure of approximately 5 bar has proved to be particularly expedient.

Furthermore, it has proved to be expedient for the process of compacting the individual conductors if the welding time of the ultrasonic welding process amounts to at least approximately 1.0 seconds, preferably to at least approximately 1.5 seconds, and in particular to at least approximately 3 seconds.

In particular, the welding time of the ultrasonic welding process is the time which is needed for the crimping element that surrounds the individual conductors to deform to a given final height (the so-called final node height) (for example, a final node height of 7.5 mm).

In principle, provision could be made for the crimping element preform to be a structural element that is manufactured separately from the electrically conductive component.

In a preferred embodiment of the invention however, provision is made for the crimping element preform to be formed in one piece with the electrically conductive component.

The crimping element preform and/or the crimping element that is formed therefrom preferably have a material thickness of at least approximately 1 mm and in particular of at least approximately 1.5 mm, of at least approximately 1.8 mm for example.

For example, the crimping element preform and/or the crimping element that is formed therefrom may comprise a preferably coated copper material having a material thickness of approximately 1.8 mm.

In order to prevent unwanted bending of the crimping element, it is expedient if the crimping element preform and/or the electrically conductive component comprise a metallic material having a tensile strength $R_m$, of more than 250 N/mm$^2$, preferably of more than 300 N/mm$^2$, and in particular of more than 350 N/mm$^2$.

For example, the crimping element preform and/or the electrically conductive component may comprise a copper material having a tensile strength of at least approximately 360 N/mm$^2$.

In a preferred embodiment of the invention, provision is made for the crimping element preform and/or the electrically conductive component to comprise copper, preferably as the main constituent.

Hereby, the main constituent of a material is considered to be that constituent which has the highest part by weight of the material.

In particular, provision may be made for the crimping element preform and/or the electrically conductive component to be formed of copper or a copper alloy.

Furthermore, it has proved to be expedient for the crimping element preform and/or the electrically conductive component to have a coating which comprises nickel and/or silver.

In principle, the individual conductors can be formed from any material that has sufficiently high electrical conductivity.

In a preferred embodiment of the invention, provision is made for the individual conductors to comprise aluminum, in particular, as the main constituent.

For example, provision may be made for the individual conductors to be formed of aluminum or an aluminum alloy.

It is expedient if the crimping element preform is formed from a material which is of greater mechanical strength than the material from which at least a portion of the individual conductors that are crimped by means of the crimping element is formed. Thereby in particular, one can achieve the effect that a sufficiently large amount of welding energy is introducible into the material of the individual conductors during the ultrasonic welding process.

For example, provision may be made for the material from which the crimping element preform is formed to have a greater tensile strength, a higher yield point and/or a higher modulus of elasticity than the material from which at least a portion of the individual conductors is formed.

Preferably, the tensile strength of the material from which the crimping element preform is formed amounts to at least double and in particular to at least three-times the tensile strength of the material from which at least a portion of the individual conductors is formed.

Furthermore, the yield point of the material from which the crimping element preform is formed preferably amounts to at least double and in particular to at least five-times, and particularly preferred to at least ten-times the yield strength of the material from which at least a portion of the individual conductors is formed.

The material from which the crimping element preform is formed can, for example, be the copper material bearing the designation Cu R360 in accord with EN 13599 which has a tensile strength of 360 MPa and a yield point of 320 MPa.

The material from which at least a portion of the individual conductors that is crimped by means of the crimping element is formed and in particular all the individual conductors that are crimped by means of the crimping element can, for example, be the aluminum material bearing the designation AW-Al 99.5 in accord with EN 573/485 which has a tensile strength of from 65 to 95 MPa and a yield point of 20 MPa.

The method in accordance with the invention is suitable, in particular, for establishing an electrically conductive connection between an electrical line of relatively large cross sectional area and an electrically conductive component.

In particular, provision may be made for the entire cross-sectional area of the individual conductors of the electrical line in the region of the crimping element, in particular after the establishment of the electrically conductive connection, to amount to more than 50 mm$^2$ and in particular to more than 55 mm$^2$, to approximately 59 mm$^2$ for example.

For particularly good compactment of the individual conductors during the ultrasonic welding process, it has proved to be expedient for the sonotrode to comprise a contact area having a longitudinal direction, wherein the longitudinal direction of the contact area includes an angle with the free edges of the crimping element of more than 45°, preferably an angle of more than 60° and in particular an angle of approximately 90° during the ultrasonic welding process.

Furthermore, it is expedient if the electrically conductive component comprises a welding region, to which at least a portion of the individual conductors of the electrical line is fixed, and a contact region, wherein the contact region is connected to the welding region by a bent region.

In particular, provision may be made for the contact region to be connected to the welding region by means of a bent section through an angle of more than 45°, preferably through an angle of more than 60°, for example, through an angle of approximately 90°.

The bent region can extend along a bending line which is directed substantially parallel to a transverse direction of the crimping element.

As an alternative thereto, provision may also be made for the bent region to extend along a bending line which is directed transverse to the transverse direction of the crimping element.

In particular, provision may be made for the bending line to include an angle of at least approximately 10° and in particular of at least approximately 20° with the transverse direction of the crimping element.

Furthermore, provision is preferably made for the bending line to include an angle of at most approximately 60° and in particular of at most approximately 45° with the transverse direction of the crimping element.

In a special embodiment of the invention, provision is made for not just one electrical line, but rather, a plurality of electrical lines and in particular two electrical lines to be connected to the electrically conductive component in electrically conductive manner, wherein a crimping element that is produced from a crimping element preform surrounds the individual conductors of a plurality of electrical lines sectionally.

Furthermore, provision may be made for the electrically conductive component to which one or more electrical lines are connected in electrically conductive manner to comprise an electrical line element which itself comprises a plurality of individual conductors or strands.

Provision is preferably made thereby for the crimping element to surround the individual conductors of the electrical line element sectionally.

In particular in this case, the crimping element thus surrounds both the individual conductors of the one electrical line or the plurality of electrical lines and also the individual conductors of the electrical line element.

Provision is preferably made thereby for the individual conductors of the one electrical line or the plurality of electrical lines on the one hand and the individual conductors of the electrical line element on the other to overlap each other in the longitudinal direction of the crimping element.

In a special embodiment of the invention, provision may be made for the individual conductors of the electrical line element to be formed from a material which is different from the material of the individual conductors of the one electrical line or the plurality of electrical lines.

Thus, for example, provision may be made for the individual conductors of the electrical line element to comprise aluminum and for the individual conductors of the one electrical line or the plurality of electrical lines to comprise copper.

As an alternative thereto, provision may also be made for the contact region to merge into the welding region without a bent section.

The electrically conductive component can be formed, in particular, as a module connector of an electro-chemical device.

The electro-chemical device can, in particular, be in the form of an accumulator and in particular a lithium ion accumulator.

Furthermore, the present invention relates to an assembly which comprises an electrical line that comprises a plurality of individual conductors and an electrically conductive component connected to the electrical line.

The further object of the present invention is to construct such an assembly in such a way that it can be assembled in a simple manner but nevertheless have a high corrosion resistance.

This object is achieved by an assembly which comprises an electrical line that comprises a plurality of individual conductors, a crimping element which surrounds the individual conductors sectionally and an electrically conductive component which is connected to at least a portion of the individual conductors by an ultrasonic welding process.

Such an assembly can, in particular, be manufactured by the previously described methods in accordance with the invention.

Further features and advantages of the invention form the subject matter of the following description and the graphical illustration of an exemplary embodiment.

BRIEF DESCRIPTION OF THE DRAWINGS

FIG. 1 shows a schematic perspective illustration of an assembly which comprises an electrical line having a plurality of individual conductors, a crimping element that surrounds the individual conductors sectionally and an electrically conductive component that is connected by ultrasonic welding to at least a portion of the individual conductors;

FIG. 2 a structural element preform that has been detached from a flat raw material;

FIG. 3 a perspective illustration of the electrically conductive component with a crimping element preform;

FIG. 4 a side view of the electrically conductive component with the crimping element preform;

FIG. 5 a front view of the electrically conductive component with the crimping element preform, as viewed in the direction of the arrow 5 in FIG. 4;

FIG. 6 a perspective illustration of a crimping tool which comprises a tool upper part, a tool lower part and a positioning element;

FIG. 7 an illustration of the crimping tool and the crimping element preform of the electrically conductive component before a crimping process for producing a crimping element from the crimping element preform;

FIG. 8 an illustration corresponding to FIG. 7 of the crimping tool and the crimping element after the crimping process by means of which the crimping element has been produced from the crimping element preform;

FIG. 9 a perspective illustration of the electrically conductive component with the crimping element;

FIG. 10 a side view of the electrically conductive component with the crimping element;

FIG. 11 a front view of the electrically conductive component with the crimping element as viewed in the direction of the arrow 11 in FIG. 10;

Similar or functionally equivalent elements are designated by the same reference symbols in all of the Figures.

DETAILED DESCRIPTION OF THE INVENTION

Figure 12:
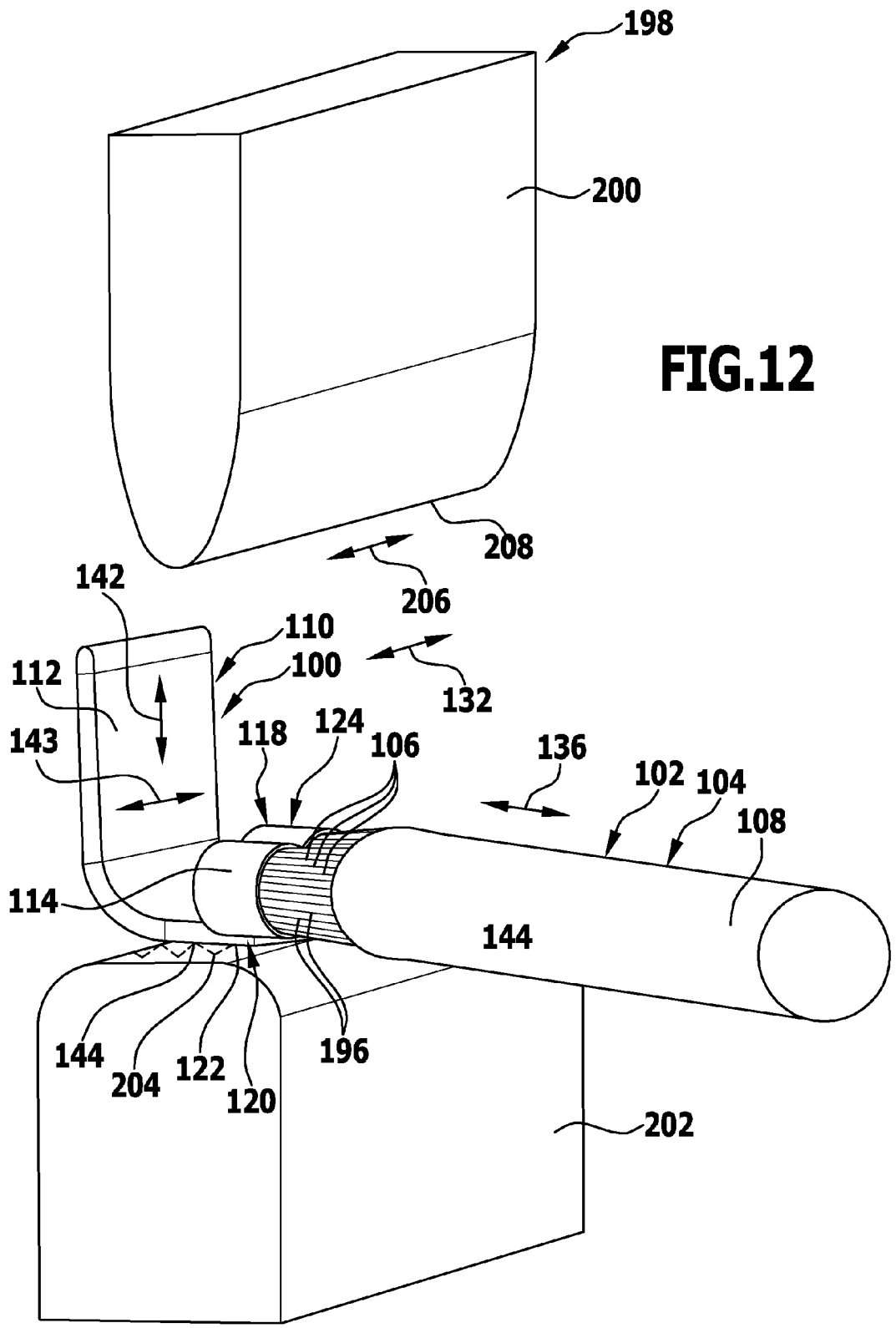
FIG. 12 a perspective illustration of a sonotrode, an anvil and the electrical line having a plurality of individual conductors that are surrounded sectionally by the crimping element of the electrically conductive component.

An assembly bearing the general reference 100 that is illustrated in FIG. 1 comprises an electrical line 102 in the form of a cable 104 which comprises a plurality of strands or individual conductors 106 and an electrically insulating sheath 108 and also an electrically conductive component 110 which comprises a substantially plate-like contact region 112 and a welding region 114 which are preferably connected to one another in one piece manner by a curved or bent-up region 116.

At least a portion of the individual conductors 106 of the electrical line 102 is connected to the electrically conductive component 110 in electrically conductive manner in the welding region 114 by an ultrasonic welding process.

The welding region 114 comprises a crimping element 118 which surrounds the individual conductors 106 sectionally. In particular, the crimping element 118 surrounds the end sections 196 of the individual conductors 106 that are not provided with the sheath 108.

The crimping element 118 has a closed side 120 having a continuous, substantially flat bearing surface 122 and a side referred to hereinafter as the open side 124 which is located opposite the closed side 120 and incorporates mutually opposite curved edge regions 126a and 126b of the crimping element 118.

Provision is preferably made thereby for the free edges 128a and 128b of the respective edge regions 126a and 126b of the crimping element 118 to end at a small spacing way from one another or for them to touch one another (see FIGS. 9 to 11, in which the electrically conductive component 110 is illustrated with the crimping element 118, but without the individual conductors 106 of the electrical line 102 that are surrounded by the crimping element 118).

The crests 130a, 130b (see FIG. 11) of the respective edge regions 126a and 126b remote from the closed side 120 of the crimping element 118 are spaced apart by an intermediate recess 134 in a transverse direction 132 of the crimping element 118.

The free edges 128a, 128b of the respective edge regions 126a and 126b of the crimping element 118 form the bottom of the recess 134 for example.

The transverse direction 132 of the crimping element 118 is oriented perpendicularly to a longitudinal direction 136 of the crimping element 118 which runs substantially parallel to the longitudinal direction of the electrical line 102 and substantially parallel to the free edges 128a and 128b of the crimping element 118.

The lateral free edges 128a, 128b of the crimping element 118 connect a front edge 138 with a rear edge 140 of the crimping element 118.

The electrically conductive component 110 including the crimping element 118 is formed from an electrically conductive metallic material.

Preferably, the electrically conductive component 110 including the crimping element 118 consists of a metallic material having a tensile strength $R_m$ of more than 250 N/mm$^2$ and in particular of more than 300 N/mm$^2$, of more than 350 N/mm$^2$ for example.

Furthermore, provision is preferably made for the electrically conductive component 110 including the crimping element 118 to comprise copper, preferably as the main constituent.

Hereby, the main constituent of a component is considered to be that material which has the largest part by weight in the component concerned.

In particular, the electrically conductive component 110 including the crimping element 118 may comprise a copper material having a tensile strength of at least approximately 360 N/mm$^2$.

The electrically conductive component 110 including the crimping element 118 preferably comprises a coating.

In particular, such a coating may comprise nickel and/or silver.

The individual conductors 106 of the electrical line 102 can, in principle, be formed from any material that has adequate electrical conductivity.

In particular, provision may be made for the individual conductors 106 to comprise aluminum and in particular to be formed of aluminum or an aluminum alloy.

The electrically conductive component 110 can, for example, be in the form of a contact shoe of a module connector of an electro-chemical device.

The contact region 112 of the electrically conductive component 110 preferably extends in a longitudinal direction 142 which is oriented, in particular, substantially perpendicularly to the longitudinal direction 136 of the crimping element 118 and/or substantially perpendicularly to the transverse direction 132 of the crimping element 118.

A preferably substantially flat bearing surface 144 of the contact region 112 preferably includes an angle $\alpha$ with the flat bearing surface 122 of the crimping element 118 of more than 45° and in particular of more than 60°, of approximately 90° for example.

As an alternative thereto, the bearing surface 144 of the contact region 112 could also be oriented substantially parallel to the bearing surface 122 of the crimping element 118 and in particular, substantially flush with the bearing surface 122 of the crimping element 118.

In the graphically illustrated embodiment of the electrically conductive component 110, a transverse direction 143 of the contact region 112 running perpendicularly to the longitudinal direction 142 of the contact region 112 and parallel to the bearing surface 144 of the contact region 112 is oriented substantially parallel to the transverse direction 132 of the crimping element 118.

As an alternative thereto however, provision could also be made for an intermediate region to be arranged between the contact region 112 and the welding region 114 of the electrically conductive component 110, a first edge of said intermediate region adjoining the welding region 114 and a second edge thereof adjoining the contact region 112, wherein the first edge and the second edge do not run in parallel with each other, but include an angle therebetween, preferably an acute angle. In this case then, the transverse direction 143 of the contact region 112 is also twisted through this angle with respect to the transverse direction 132 of the crimping element 118.

For the purposes of producing the previously described assembly 100 that is illustrated in FIG. 1 and also FIGS. 9 to 11, one proceeds as follows.

A structural element preform 146 that is illustrated in FIG. 2 is detached by being cut out, preferably by means of a laser for example, or stamped out, from a suitable raw material such as a metal sheet for example which is preferably flat.

The closed side 120 and also the edge regions 126a and 126b of the eventual crimping element 118 are located in this structural element preform 146 in substantially the same plane, wherein the two edge regions 126a and 126b extend in mutually opposite directions along the transverse direction 132 of the crimping element 118 away from the closed side 120.

From this substantially flat structural element preform 146 that is illustrated in FIG. 2, the electrically conductive component 110 with the crimping element preform 148 that is illustrated in FIGS. 3 to 5 is produced by bending out the edge regions 126a and 126b as well as the contact region 112 from the plane of the closed side 120 in such a way that they extend substantially parallel to the longitudinal direction 142 of the contact region 112 and substantially perpendicularly to the bearing surface 122 of the closed side 120.

The edge regions 126a and 126b are connected by respective curved regions 150a and 150b to the closed side 120 of the crimping element preform 148 in this crimping element preform 148.

The contact region 112 is already connected in this state by means of the bent region 116 to the closed side 120 of the crimping element preform 148.

For the purposes of connecting the individual conductors 106 of the electrical line 102 to the electrically conductive component 110 by a crimping process, the crimping tool 152 illustrated in FIG. 6 is used for example.

This crimping tool 152 comprises a tool upper part 154, a tool lower part 156 and a positioning element 158.

The positioning element 158 comprises a base 160 having an upper side 162 from which a rear supporting element 164 and two lateral supporting elements 166 extend upwardly.

The rear supporting element 164 has a front guide surface 168 facing the lateral supporting elements 166 upon which the bearing surface 144 of the contact region 112 of the electrically conductive component 110 is placeable, preferably substantially flatly, for the crimping process.

The lateral supporting elements 166 have a respective lateral guide surface 170 on their mutually facing sides upon which the contact region 112 of the electrically conducting element 110 is laterally supported during the crimping process.

Apart from the rear supporting element 164 and the lateral supporting elements 166, the remaining portion of the upper side 162 of the base 160 of the positioning element 158 forms a seating surface 172 on which a part of the bearing surface 122 of the crimping element preform 148 of the electrically conductive component 110 abuts, preferably substantially flatly, during the crimping process.

The tool upper part 154 of the crimping tool 152 comprises a substantially parallelepipedal block 174 for example which has a recess 176 on the side thereof facing the tool lower part 156 during the crimping process, the margin of the upper edge of said recess having a crimping profile 178 which is complementary to the open side 124 of the finished crimping element 118.

In particular, the crimping profile 178 can thus comprise two substantially semi-circular or segments of semi-circular profile sections 180 that are arranged next to each other in a transverse direction 182 of the crimping tool 152 which coincides with the transverse direction 132 of the crimping element 118 that is to be produced.

The tool upper part 154 is moveable relative to the tool lower part 156 along a pressing direction 184 which runs substantially perpendicularly to the transverse direction 182 and substantially perpendicularly to the longitudinal direction 142 of the crimping element 118 that is to be produced.

Inclined bounding surfaces 186 of the recess 176 in the tool upper part 154 extend from the mutually remote edges of the profile sections 180 in the direction of the tool lower part 156.

The inclined bounding surfaces 186 are inclined at an acute angle with respect to the pressing direction 184 of the crimping tool 152.

The tool lower part 156 comprises a base 188 from which an anvil 190 extends in the direction of the tool upper part 154.

The anvil has two lateral inclined bounding surfaces 192 which are preferably inclined at substantially the same angle with respect to the pressing direction 184 of the crimping tool 152 as the inclined bounding surfaces 186 of the recess 176 of the tool upper part 154, and also a seating surface 194 which faces the crimping profile 178 of the tool upper part 154 and matches the shape of the bearing surface 122 of the finished crimping element 118.

In particular, the seating surface 194 can then be substantially flat.

For the purposes of the crimping process by means of which the individual conductors 106 of the electrical line 102 are connected to the electrically conductive component 110 by the crimping action when forming the crimping element 118, the electrically conductive component 110 with the crimping element preform 148 that is illustrated in FIGS. 3 to 5 is inserted into the crimping tool 152 in such a way that the bearing surface 144 of the contact region 112 abuts on the front guide surface 168 of the positioning element 158 and the bearing surface 122 of the crimping element preform 148 abuts on the seating surface 172 of the positioning element 158 and on the seating surface 194 of the tool lower part 156. The crimping element preform 148 thereby comes to be located in the space between the tool lower part 156 and the tool upper part 154 in the region of the recess 176 of the tool upper part 154 (see FIG. 7).

The end sections 196 of the individual conductors 106 of the electrical line 102 that are not provided with the sheath 108 are inserted into the crimping element preform 148 between the upturned edge regions 126a and 126b (for reasons of clarity, the individual conductors 106 are not illustrated in FIGS. 7 and 8).

Thereafter, the tool upper part 154, which was initially spaced from the tool lower part 156 in the pressing direction 184 (see FIG. 7), is moved along the pressing direction 184 towards the tool lower part 156, wherein a deformation pressure is transmitted to the crimping element preform 148 by the inclined bounding surfaces 186 of the recess 176 and the crimping profile 178.

Due to this deformation pressure, the crimping element preform 148 is deformed in plastic manner in such a way that the crimping element 118, which is illustrated in FIG. 8 and has an e.g. substantially B-shaped cross section that is complementary to the crimping profile 178, is formed from the crimping element preform 148.

During the process of producing the crimping element 118 from the crimping element preform 148, the edge regions 126a, 126b of the crimping element 118 are bent around the end sections 196 of the individual conductors 106 that are not provided with the sheath 108 and are pressed against the individual conductors 106 in such a way that the end sections 196 of the individual conductors 106 surrounded by the crimping element 118 are compacted and pressed against one another in force-locking manner.

Due to the compacting action occurring during the crimping process, the spatial volume of the electrical line 102 remaining between the individual conductors 106 is reduced in the region of the crimping element 118.

When the final state illustrated in FIG. 8 is reached, wherein the inclined bounding surfaces 186 of the tool upper part 154 abut on the inclined bounding surfaces 192 of the tool lower part 156, the crimping process is finished.

The crimping tool 152 is now opened by moving the tool upper part 154 relative to the tool lower part 156 along the pressing direction 184 away from the tool lower part 156, and the assembly 100 incorporating the electrically conductive component 110 and the electrical line 102 of which the individual conductors 106 thereof are connected to the electrically conductive component 110 by the crimping element 118 is removed from the crimping tool 152 and inserted into the ultrasonic welding tool 198 that is illustrated schematically in FIG. 12.

The ultrasonic welding tool 198 comprises a sonotrode 200 and an anvil 202 located opposite the sonotrode 200.

The assembly 100 is placed on the anvil 202 in such a way that the bearing surface 122 of the crimping element 118 comes to rest on a seating surface 204 of the anvil 202.

Thereafter, the sonotrode 200 is advanced towards the assembly 100 in such a way that a contact area 208 of the sonotrode 200 extending in a longitudinal direction 206 of the sonotrode 200 comes into contact with the open side 124 of the crimping element 118.

Hereby, the longitudinal direction 206 of the contact area 208 of the sonotrode 200 is preferably oriented substantially parallel to the transverse direction 132 of the crimping element 118 so that the sonotrode 200 extends transversely over the recess 134 between the edge regions 126a and 126b of the crimping element 118.

The ultrasonic welding process is carried out on the assembly 100 by means of the sonotrode 200 so that the individual conductors 106 of the electrical line 102 are welded together and also to the inner side of the crimping element 118 on the electrically conductive component 110 by a friction welding process and are thus connected by a substance-to-substance bond.

During the ultrasonic welding process, the direction of excitation of the sonotrode 200 is preferably oriented substantially parallel to the transverse direction 132 of the crimping element 118 and/or substantially parallel to the longitudinal direction 206 of the sonotrode 200.

The crimping element 118 and the individual conductors 106 are subjected to a welding pressure by the sonotrode 200 during the ultrasonic welding process.

The welding pressure preferably amounts, at least intermittently, to at least approximately 3 bar and in particular to at least approximately 4 bar, to at least approximately 5 bar for example.

A welding pressure of approximately 5 bar has proved to be particularly expedient in trials.

The welding time during which the ultrasonic welding process takes place preferably amounts to at least approximately 1.0 seconds and in particular to at least approximately 1.5 seconds, to at least approximately 3 seconds for example.

Preferably, the target size for the ultrasonic welding process is the final node height, i.e., the final height of the crimping element 118 in the present case.

The sonotrode 200 penetrates into the crimping element 118 in the course of the ultrasonic welding process and deforms it. The ultrasonic welding process is continued until such time as a predetermined final height of the crimping element 118 (for example a final height of 7.5 mm starting from a height of 9.8 mm) is reached.

It is thereby ensured that the process of compacting the individual conductors 106 and hence too the corrosion resistance are always equally good.

The welding energy transmitted by the sonotrode 200 into the assembly 100 during the ultrasonic welding process preferably amounts to at least approximately 3,000 Ws and in particular to at least approximately 4,000 Ws, to at least approximately 5,000 Ws for example and to at most approximately 7,000 Ws for example.

If the target size of the ultrasonic welding process is the final node height, the energy being introduced is a resulting factor.

A portion of the excitation energy from an ultrasonic process may be lost since the assembly 100 vibrates in unison.

The individual conductors 106 in the region of the crimping element 118 are further compacted by the ultrasonic welding process i.e., the spatial volume of the electrical line 102 remaining between the individual conductors 106 is reduced still more by the ultrasonic welding process.

After the termination of the ultrasonic welding process, the ultrasonic welding tool 198 is opened and the finished assembly 100, in which the individual conductors 106 of the electrical line 102 are connected to the electrically conductive component 110 by the crimping process by means of the crimping element 118 and also by virtue of the ultrasonic welding process, is removed from the ultrasonic welding tool 198.

A second embodiment of an assembly 100 that is illustrated in FIGS. 13 to 16 differs from the previously described embodiment illustrated in FIGS. 1 to 12 in that the bent region 116 by means of which the contact region 112 of the electrically conductive component 110 is connected to the welding region 114 extends along a bending line 210 which is not oriented substantially parallel to the transverse direction 132 of the crimping element 118 as in the first embodiment, but rather, extends transverse to the transverse direction 132 of the crimping element 118.

Hereby, the bending line 210 and the transverse direction 132 of the crimping element 118 preferably include an angle of more than approximately 10° and in particular of more than approximately 20°.

Furthermore, the bending line 210 and the transverse direction 132 of the crimping element 118 preferably include an angle of less than approximately 60° and in particular of less than approximately 45°.

For example, the angle included between the bending line 210 and the transverse direction 132 of the crimping element 118 may amount to approximately 25°.

Figure 16:
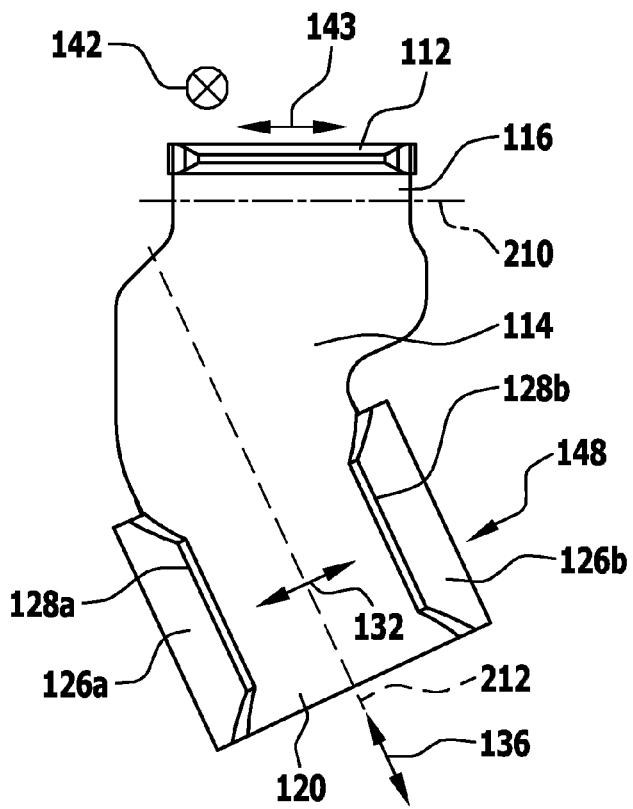
FIG. 16 a plan view from above of the electrically conductive component with the crimping element preform in the second embodiment of the assembly.

In this embodiment, the welding region 114 of the electrically conductive component 110 is thus formed asymmetrically with respect to a longitudinal mid plane 212 of the crimping element 118 which runs substantially perpendicularly to the bearing surface 122 of the crimping element 118 and substantially parallel to the longitudinal direction 136 of the crimping element 118 (see FIG. 16).

It is thereby possible to select the orientation of the contact region 112 of the electrically conductive component 110 independently of the orientation of the crimping element 118.

For the purposes of producing the second embodiment of the assembly 100, one proceeds as follows.

Figure 14:
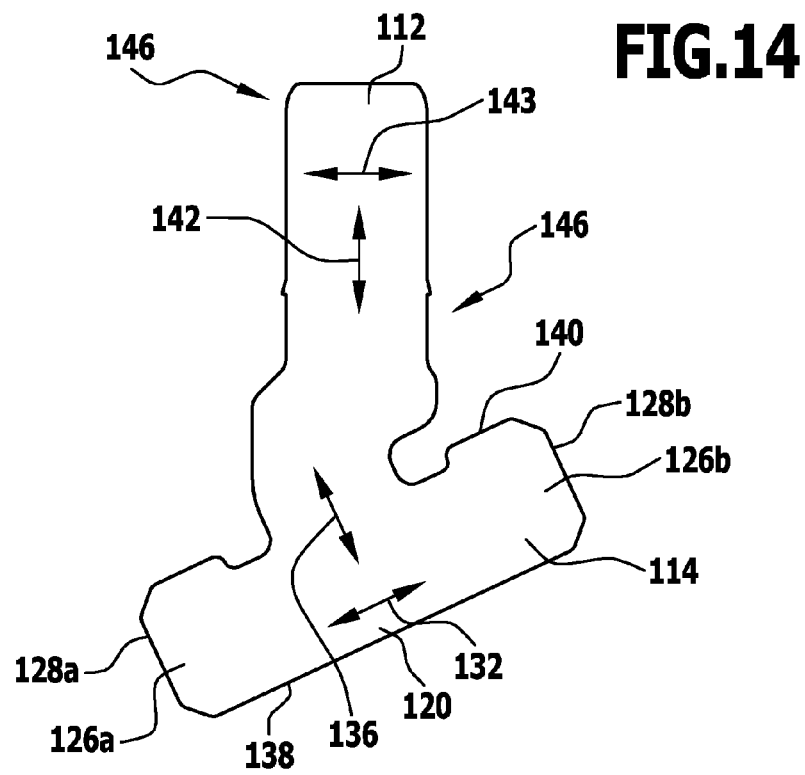
FIG. 14 a structural element preform of the second embodiment of the assembly that has been detached from a flat raw material.

A structural element preform 146 that is illustrated in FIG. 14 is detached by being cut out preferably by means of a laser for example, or stamped out, from a suitable raw material such as a metal sheet for example which is preferably flat.

Figure 15:
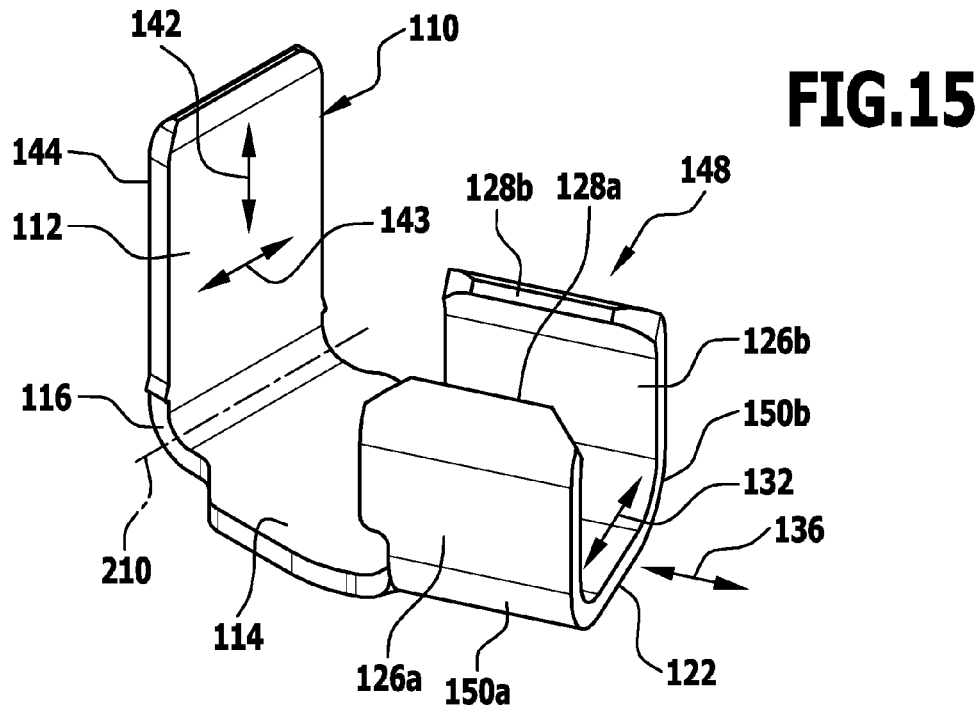
FIG. 15 a perspective illustration of the electrically conductive component with a crimping element preform in the second embodiment of the assembly.

The electrically conductive component 110 with the crimping element preform 148 that is illustrated in FIGS. 15 and 16 is produced from the substantially flat structural element preform 146 that is illustrated in FIG. 14 by curving up the edge regions 126a and 126b as well as the contact region 112 from the plane of the closed side 120 in such a way that they extend substantially parallel to the longitudinal direction 136 of the eventual crimping element 118 and substantially perpendicularly to the bearing surface 122 of the closed side 120.

In this state, the contact region 112 is connected by the bent region 116 which extends along the bending line 210 to the asymmetrically formed welding region 114.

The process of connecting the individual conductors 106 of the electrical line 102 to the electrically conductive component 110 by a crimping process and the process of connecting the individual conductors 106 of the electrical line 102 to one another and to the inner side of the crimping element 118 on the electrically conductive component 110 by an ultrasonic welding process can be effected in the manner described above in connection with the first embodiment of the assembly 100.

Figure 13:
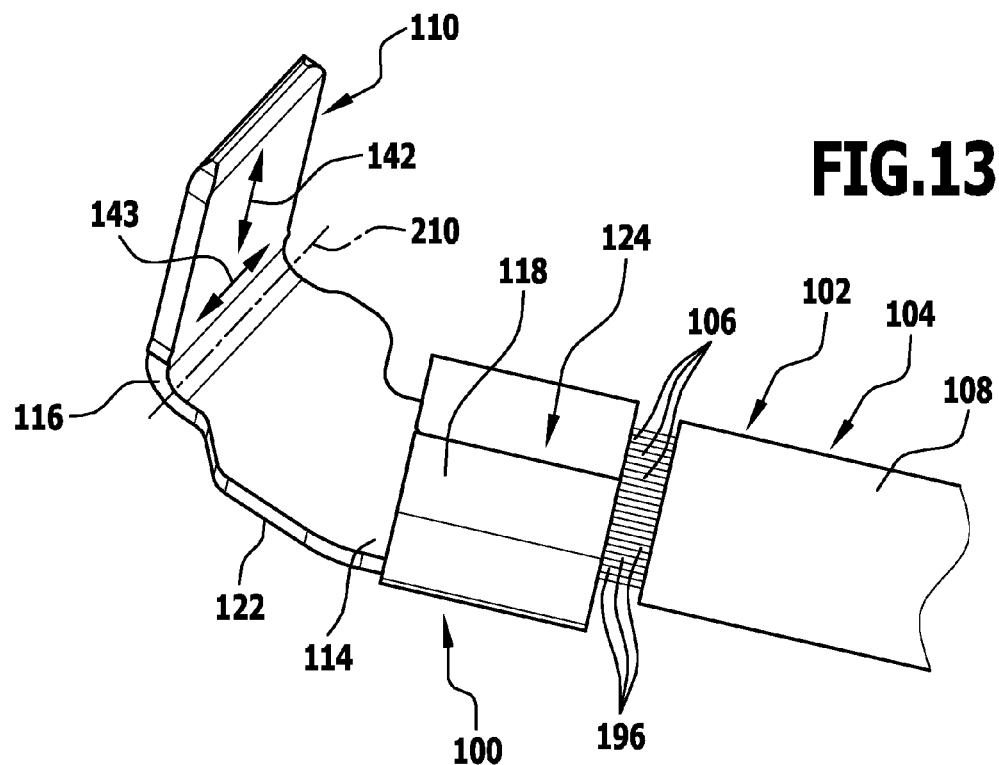
FIG. 13 a schematic perspective illustration of a second embodiment of an assembly which comprises an electrical line having a plurality of individual conductors, a crimping element that surrounds the individual conductors sectionally and an electrically conductive component that is connected by ultrasonic welding to at least a portion of the individual conductors, wherein the electrically conductive component comprises a welding region to which at least a portion of the individual conductors of the electrical lines is fixed, and a contact region which is connected to the welding region by a bent region, and wherein the bent region extends along a bending line which is directed transverse to a transverse direction of the crimping element.

The result of the crimping process and the subsequent ultrasonic welding process is the finished assembly 100 that is illustrated in FIG. 13.

In all other respects, the second embodiment of the assembly 100 that is illustrated in FIGS. 13 to 16 corresponds in regard to the construction, functioning, manner of production and choice of materials with the first embodiment that is illustrated in FIGS. 1 to 12 and so to this extent, reference should be made to the preceding description.

A third embodiment of an assembly 100 that is illustrated in FIGS. 17 to 22 differs from the first embodiment illustrated in FIGS. 1 to 12 in that not just one but a plurality and in particular two electrical lines 102, namely a first electrical line 102a and a second electrical line 102b, are connected to the electrically conductive component 110 in electrically conductive manner by means of the crimping element 118.

Hereby, the electrical lines 102a and 102b may, for example, be constructed in the same manner as the single electrical line 102 in the previously described first embodiment of the assembly 100.

In particular, the electrical lines 102a and 102b may each comprise a plurality of strands or individual conductors 106 and an electrically insulating sheath 108.

The electrically conductive component 110 to which the electrical lines 102a and 102b are connected in electrically conductive manner could, just as in the first embodiment, be formed in one piece with the crimping element 118 and be designed in substantially the same way as was previously described in connection with the first embodiment of the assembly 100.

Figure 17:
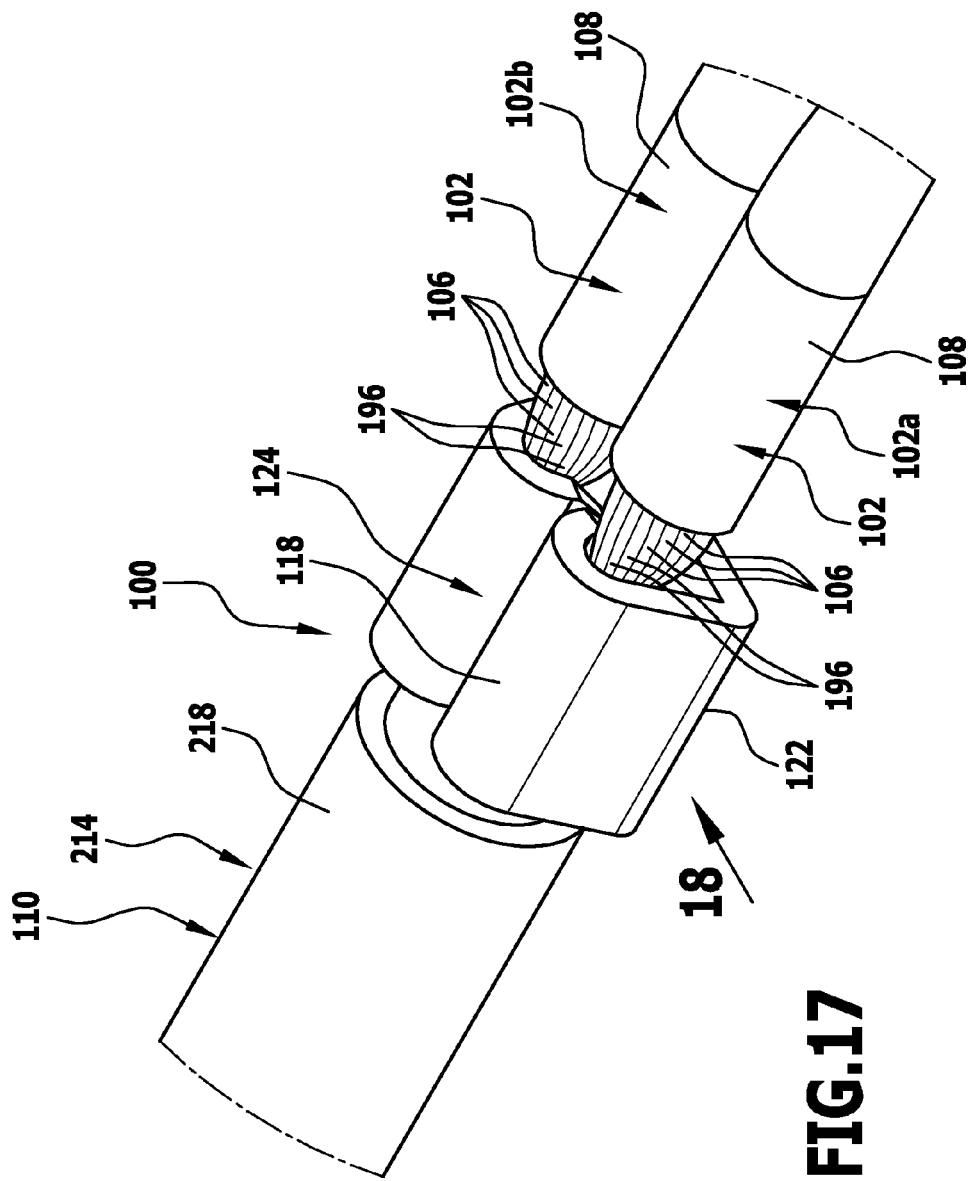
FIG. 17 a schematic perspective illustration of a third embodiment of an assembly which comprises two electrical lines each of which incorporates a plurality of individual conductors, an electrical line element having a plurality of individual conductors in the form of an electrically conductive component and a crimping element that surrounds both the individual conductors of the electrical lines and also the individual conductors of the electrical line element sectionally, wherein at least a portion of the individual conductors of the electrical lines is connected to at least a portion of the individual conductors of the electrical line element by ultrasonic welding.
Figure 18:
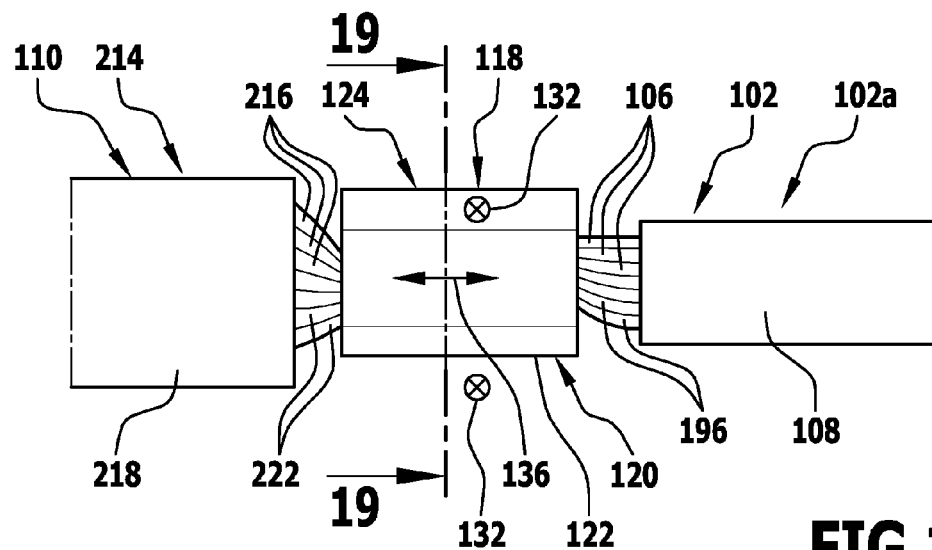
FIG. 18 a side view of the assembly depicted in FIG. 17 as viewed in the direction of the arrow 18 in FIG. 17.

In the embodiment illustrated in FIGS. 17 to 22 however, the electrically conductive component 110 is produced separately from the crimping element 118 and in particular, it is in the form of an electrical line element 214 which comprises a plurality of strands or individual conductors 216 and an electrically insulating sheath 218 (see in particular FIG. 18).

Figure 19:
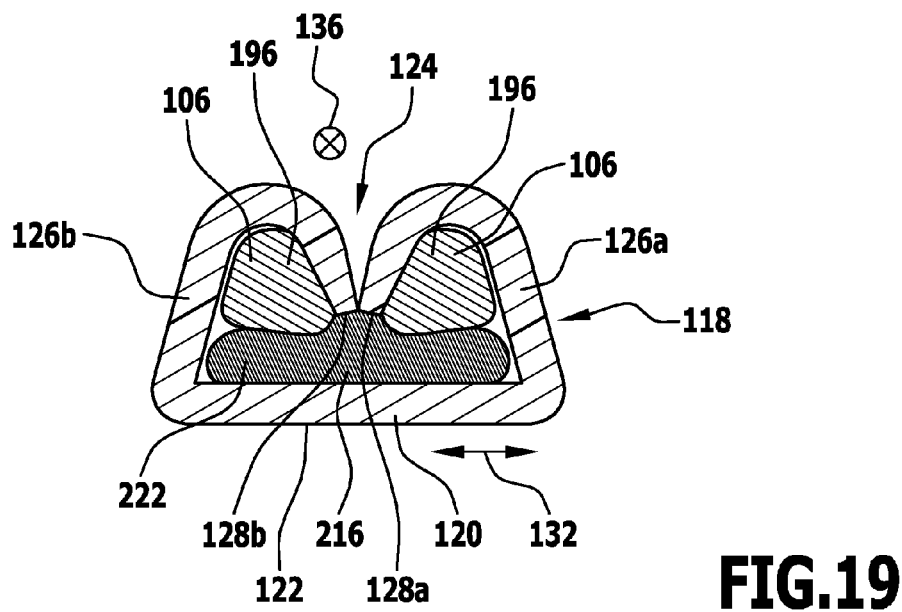
FIG. 19 a cross section through the crimping element of the assembly depicted in FIG. 18 and the individual conductors of the electrical lines and the electrical line element that are surrounded sectionally by the crimping element, along the line 19-19 in FIG. 18.

As can be gathered from the cross sectional view of FIG. 19, the crimping element 118 here surrounds both the individual conductors 106 of the electrical lines 102a and 102b and also the individual conductors 216 of the electrical line element 214.

Herein, the stripped end regions of the individual conductors 106 of the electrical lines 102a and 102b on the one hand and the stripped end regions of the individual conductors 216 of the electrical line element 214 on the other overlap in the longitudinal direction 136 of the crimping element 118.

The crimping element 118 may be formed in substantially the same manner as was previously described in connection with the first embodiment of the assembly 100 but without being formed in one piece with the electrically conductive component 110.

The individual conductors 106 of the electrical lines 102a, 102b on the one hand and the individual conductors 216 of the electrical line element 214 on the other can, in principle, be formed from substantially the same electrically conductive material and in particular from a metallic material such as aluminum, an aluminum alloy, copper or a copper alloy for example.

In a special arrangement of this embodiment of the assembly 100 however, provision is made for the individual conductors 216 of the electrical line element 214 to be formed from a material which is different from the material of the individual conductors 106 of the electrical lines 102a, 102b.

For example, provision may be made for the individual conductors 106 of the electrical lines 102a, 102b to be formed of copper or a copper alloy, whilst the individual conductors 216 of the electrical line element 214 are formed of aluminum or an aluminum alloy.

Conversely, the individual conductors 106 of the electrical lines 102a, 102b could be made of aluminum or an aluminum alloy and the individual conductors 216 of the electrical line element 214 made of copper or a copper alloy.

Furthermore, provision could also be made for the individual conductors 106 of the two electrical lines 102a and 102b not to be formed from the same electrically conductive material, but rather, from mutually differing electrically conductive materials.

For the purposes of producing the previously described assembly 100 that is illustrated in FIGS. 17 to 19, one proceeds as follows.

Figure 20:
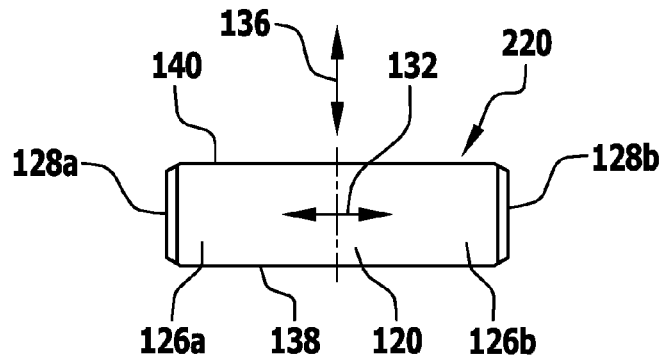
FIG. 20 a crimping element starter blank that has been detached from a flat raw material.

A crimping element starting blank 220 that is illustrated in FIG. 20 is detached by being cut out, preferably by means of a laser for example, or stamped out, from a suitable raw material such as a metal sheet for example which is preferably flat.

The closed side 120 and also the edge regions 126a and 126b of the eventual crimping element 118 lie in substantially the same plane in this crimping element starting blank 220 wherein the two edge regions 126a and 126b extend away from the closed side 120 in mutually opposite directions along the transverse direction 132 of the crimping element 118.

Figure 21:
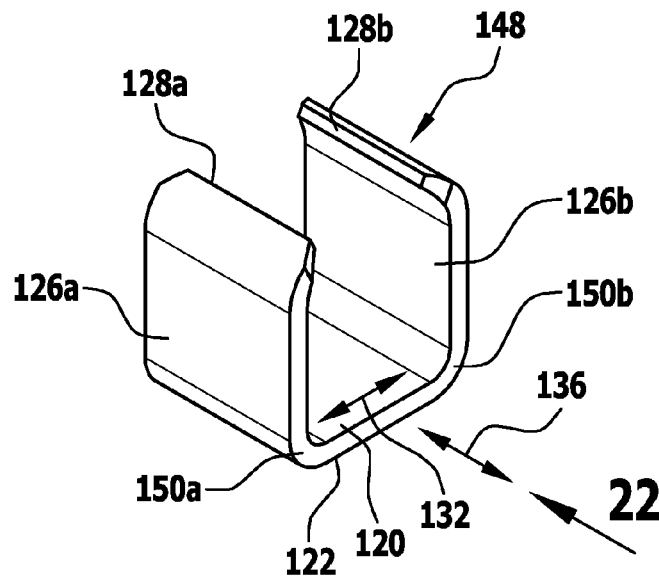
FIG. 21 a perspective illustration of a crimping element preform of the third embodiment of the assembly which has been produced from the substantially flat crimping element starter blank illustrated in FIG. 20 by bending out the edge regions of the eventual crimping element from the plane of the closed side of the crimping element.
Figure 22:
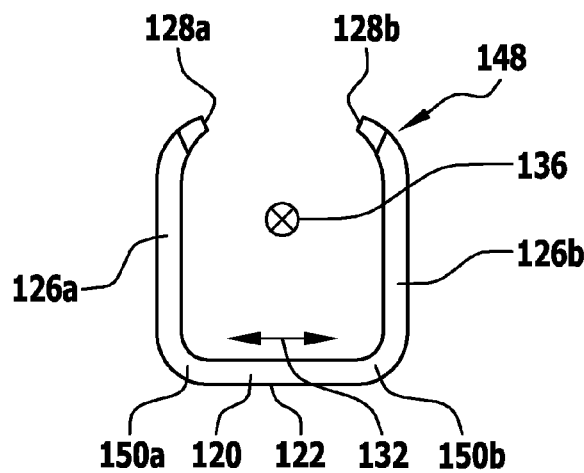
FIG. 22 a front view of the crimping element preform depicted in FIG. 21 as viewed in the direction of the arrow 22 in FIG. 21.

The crimping element preform 148 that is illustrated in FIGS. 21 and 22 is produced from the substantially flat crimping element starting blank 220 that is illustrated in FIG. 20 by bending out the edge regions 126a and 126b from the plane of the closed side 120 in such a way that they extend substantially parallel to the longitudinal direction 136 and substantially perpendicularly to the bearing surface 122 of the closed side 120 of the crimping element 118.

The edge regions 126a and 126b are connected to the closed side 120 of the crimping element preform 148 by curved regions 150a, 150b in this crimping element preform 148.

The crimping tool 152 illustrated in FIG. 6 for example is used for the purposes of connecting the individual conductors 106 of the electrical lines 102a, 102b and the individual conductors 216 of the electrical line element 214 by means of a crimping process.

For the purposes of the crimping process during which the crimping element 118 is formed and by means of which the individual conductors 106 of the electrical lines 102a, 102b are connected by the crimping action to the individual conductors 216 of the electrical line element 214 that form a constituent of the electrically conductive component 110, the end sections 196 of the individual conductors 106 of the electrical lines 102a, 102b that are not provided with the sheath 108 are inserted into the crimping element preform 148 between the upright edge regions 126a and 126b from the one side of the crimping element preform 148, and the end sections 222 of the individual conductors 216 of the electrical line element 214 that are not provided with the sheath 218 are inserted into the crimping element preform 148 between the upright edge regions 126a and 126b from the other side of the crimping element preform 148.

Thereby for example, provision may be made for the individual conductors 106 of the electrical lines 102a and 102b to be arranged on the side of the individual conductors 216 of the electrical line element 214 that is remote from the closed side 120 of the crimping element 118 as can be gathered from the cross sectional view of FIG. 19.

The crimping element preform 148 is deformed in plastic manner by means of the crimping tool 152 in such a way that the crimping element 118 which is illustrated in FIGS. 17 to 19 and has a substantially B-shaped cross section for example is obtained from the crimping element preform 148.

During the process of producing the crimping element 118 from the crimping element preform 148, the edge regions 126a, 126b of the crimping element 118 are curved around the end sections 196 of the individual conductors 106 of the electrical lines 102a, 102b that are not provided with the sheath 108 and thereby pressed against the individual conductors 106 such that the end sections 196 of the individual conductors 106 that are surrounded by the crimping element 118 are pressed together in force-locking manner.

At the same time in the process of producing the crimping element 118 from the crimping element preform 148, the end sections 222 of the individual conductors 216 of the electrical line element 214 that are not provided with the sheath 218 are pressed against the individual conductors 106 of the electrical lines 102a, 102b in such a way that the end sections 222 of the individual conductors 216 that are surrounded by the crimping element 118 are compacted and are pressed against one another and the individual conductors 106 of the electrical lines 102a, 102b in force-locking manner.

The spatial volume of the electrical lines 102a, 102b remaining between the individual conductors 106 and the spatial volume of the electrical line element 214 remaining between the individual conductors 216 are reduced in the region of the crimping element 118 by the compacting action during the crimping process.

Subsequently, the assembly 100 consisting of the electrical lines 102a and 102b, the crimping element 118 and the electrical line element 214 is removed from the crimping tool 152 and inserted into an ultrasonic welding tool 198 such as the one illustrated in FIG. 12 for example.

The assembly 100 is placed on the anvil 202 in such a way that the bearing surface 122 of the crimping element 118 comes to lie on the seating surface 204 of the anvil 202.

Thereafter, the sonotrode 200 is advanced towards the assembly 100 in such a way that the contact area 208 of the sonotrode 200 extending in the longitudinal direction 206 of the sonotrode 200 comes into contact with the open side 124 of the crimping element 118.

The ultrasonic welding process is carried out on the assembly 100 by means of the sonotrode 200 so that the individual conductors 106 of the electrical lines 102a, 102b are welded together and to the individual conductors 216 of the electrical line element 214 as well as to the inner side of the crimping element 118 and the individual conductors 216 of the electrical line element 214 are welded together, to the individual conductors 106 of the electrical lines 102a, 102b and to the inner side of the crimping element 118 by a friction welding process and are thus connected by a substance-to-substance bond.

After termination of the ultrasonic welding process, the ultrasonic welding tool 198 is opened and the finished assembly 100 in which the individual conductors 106 of the electrical lines 102a, 102b are connected to the individual conductors 216 of the electrical line element 214 by both the crimping process by means of the crimping element 118 and by the ultrasonic welding process is removed from the ultrasonic welding tool 198.

In all other respects the third embodiment of an assembly 100 that is illustrated in FIGS. 17 to 22 corresponds in regard to the construction, functioning, manner of production and choice of materials to the first embodiment illustrated in FIGS. 1 to 12 so that to this extent, reference is made to the previous description thereof.

The invention claimed is:

1. A method for establishing an electrically conductive connection between an electrical line which comprises a plurality of individual conductors and an electrically conductive component, comprising the following:
producing a crimping element that surrounds the individual conductors sectionally from a crimping element preform by means of a crimping tool;
connecting at least a portion of the individual conductors to the electrically conductive component by an ultrasonic welding process by means of a sonotrode;
wherein the sonotrode comes into contact with the crimping element during the ultrasonic welding process.

2. The method in accordance with claim 1, wherein the sonotrode is different from the crimping tool.

3. The method in accordance with claim 1, wherein the ultrasonic welding process is begun after the production of the crimping element.

4. The method in accordance with claim 1, wherein the individual conductors are compacted by means of the crimping tool and also by means of the sonotrode.

5. The method in accordance with claim 1, wherein the welding pressure of the sonotrode amounts to at least approximately 3 bar at least intermittently.

6. The method in accordance with claim 1, wherein the welding time of the ultrasonic welding process amounts to at least approximately 1.0 seconds.

7. The method in accordance with claim 1, wherein the crimping element preform is formed in one piece with the electrically conductive component.

8. The method in accordance with claim 1, wherein the crimping element preform and/or the electrically conductive component comprises a metallic material having a tensile strength of more than 250 N/mm$^2$.

9. The method in accordance with claim 1, wherein the crimping element preform and/or the electrically conductive component comprises copper.

10. The method in accordance with claim 1, wherein the crimping element preform and/or the electrically conductive component has a coating which comprises nickel and/or silver.

11. The method in accordance with claim 1, wherein the individual conductors comprise aluminum.

12. The method in accordance with claim 1, wherein the crimping element preform is formed from a material which has a higher tensile strength, a higher yield point and/or a higher modulus of elasticity than the material from which at least a portion of the individual conductors surrounded by the crimping element sectionally is formed.

13. The method in accordance with claim 1, wherein the entire cross-sectional area of the individual conductors of the electrical line amounts to more than 50 mm$^2$ in the region of the crimping element.

14. The method in accordance with claim 1, wherein the sonotrode has a contact area having a longitudinal direction, wherein the longitudinal direction of the contact area includes an angle of more than 45° with a longitudinal direction of the crimping element which runs parallel to free edges of the crimping element during the ultrasonic welding process.

15. The method in accordance with claim 1, wherein the electrically conductive component comprises a welding region, to which at least a portion of the individual conductors of the electrical line is fixed, a substantially plate-like contact region and a bent region, which is bent at a bending line, wherein the contact region is connected to the welding region by the bent region.

16. The method in accordance with claim 15, wherein the bending line is directed transverse to a transverse direction of the crimping element, wherein the transverse direction of the crimping element is oriented perpendicularly to a longitudinal direction of the crimping element which runs parallel to free edges of the crimping element.

17. The method in accordance with claim 1, wherein a plurality of electrical lines are connected in electrically conductive manner to the electrically conductive component,
wherein the crimping element surrounding the individual conductors of the plurality of electrical lines sectionally is produced from a crimping element preform.

18. The method in accordance with claim 1, wherein the electrically conductive component comprises an electrical line element which comprises a plurality of individual conductors.

19. The method in accordance with claim 18, wherein the crimping element surrounds the individual conductors of the electrical line element sectionally.

20. The method in accordance with claim 18, wherein the individual conductors of the electrical line element are formed from a material which is different from the material of the individual conductors of the electrical line.

21. The method in accordance with claim 1, wherein the crimping element preform is formed in one piece with the electrically conductive component.

* * * * *